E. A. FOETISCH.
IMPLEMENT FOR REMOVING SEPARATORS FROM STORAGE BATTERIES.
APPLICATION FILED MAR. 16, 1921.
1,418,554.
Patented June 6, 1922.
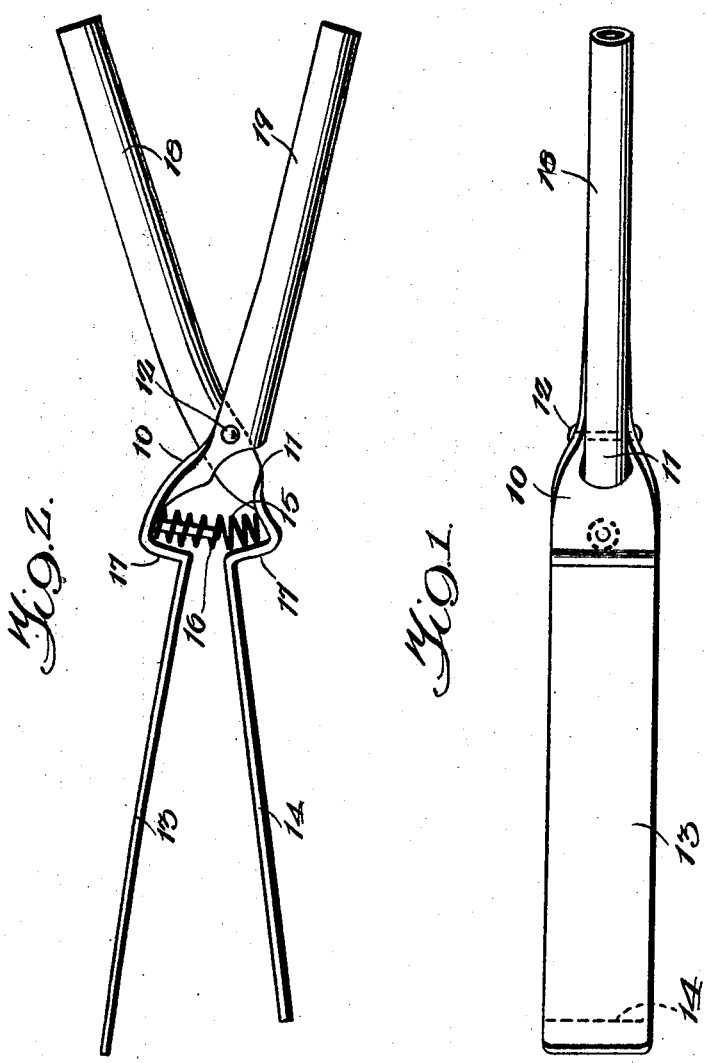
WITNESSES
INVENTOR
ERNEST A. FOETISCH,
BY
ATTORNEYS

UNITED STATES PATENT OFFICE.

ERNEST ADOLPH FOETISCH, OF ALBUQUERQUE, NEW MEXICO.

IMPLEMENT FOR REMOVING SEPARATORS FROM STORAGE BATTERIES.

1,418,554.   Specification of Letters Patent.   Patented June 6, 1922.

Application filed March 16, 1921. Serial No. 452,752.

*To all whom it may concern:*

Be it known that I, ERNEST A. FOETISCH, a citizen of the United States, and a resident of Alburquerque, in the county of Bernalillo and State of New Mexico, have invented certain new and useful Improvements in Implements for Removing Separators from Storage Batteries, of which the following is a specification.

My present invention relates generally to clamping and lifting tongs, and more particularly to a tong of this type constructed, designed and adapted for use in removing separators from storage batteries.

It is a well known fact that at the present time removal of the separators from storage batteries is necessarily accomplished by hand to the decided disadvantage of the person or persons engaged in such operation both as regards removal of paste from the plates and the action of the fluid acid.

In the accompanying drawing which illustrates my present invention and forms a part of this specification, Figure 1 is a top plan view of my improved implement, and Figure 2 is a side view thereof.

Referring now to these figures my invention proposes an implement for removing separators from storage batteries consisting of a pair of crossed shanks 10 and 11 whose fulcrum is formed by a pivot pin 12 and whose extensions beyond this pivot pin are formed by a pair of elongated flatwise opposing gripping blades 13 and 14 of generally rectangular form disposed to move toward and away from one another in the same plane as that of the shanks 10 and 11 in their movement on the fulcrum formed by the pivot 12. These gripping blades 13 and 14 of the form and shape shown are particularly adapted for insertion in a storage battery to grip and remove the separators and are preferably supported in normally spaced relation by a spring 15 compressed therebetween immediately adjacent to the pivot pin 12 the spring being held in place upon a pin 16 extending from one of the blades toward the other.

It will also be observed that the blades are each acutely bent adjacent to the pivot pin 12 and in advance of the spring 15 to form a forwardly facing shoulder 17, these shoulders operating to limit movement of the blades into a battery cell, so that the blades will be held evenly in line with the plates for movement between the same and the separators in the removal of the latter.

The shanks 10 and 11 at their free ends form elongated handles 18 and 19 located upon the relatively opposite side of the fulcrum 12 to the blades, and which provide for effective hand grip not only in clamping the blades 13 and 14 against the work held therebetween, but in lifting the separators out of the battery, and it is thus obvious that the implement will be capable of effective, efficient use, is simple and inexpensive, and will be strong and durable.

I claim:

1. An implement for removing separators from storage batteries comprising a pair of crossed pivoted shanks, having their extensions at one side of their pivot in the form of longitudinally elongated flatwise opposing clamping blades of rectangular shape, said blades having shoulders limiting their movement into a battery cell, and a spring between the blades protected by said shoulders.

2. An implement for removing separators from storage batteries including a pair of pivoted shanks having longitudinally elongated extensions at one side of their pivot opposing one another in face to face relation to form clamping blades, and having extending handles at the opposite side of said pivot each of said blades being thin and flat throughout and having a shoulder adjacent to its inner end.

3. An implement for removing separators from storage batteries including a pair of crossed pivoted shanks having longitudinally elongated flattened extensions at one side of their pivot opposing one another in flatwise relation to form gripping blades, and also having handles at the opposite side of the pivot, a spring compressed between the gripping blades adjacent to the pivot of the shanks, and means for limiting movement of the blades into a battery cell.

4. An implement for removing separators from storage batteries including a pair of crossed pivoted shanks having longitudinally elongated flattened extensions at one side of their pivot opposing one another in flatwise relation to form clamping blades, and having extending handles at the opposite side of said pivot, said blades having acutely angular portions adjacent to the said pivot pin, forming forwardly presented shoulders limiting movement of the blades into a battery cell.

ERNEST ADOLPH FOETISCH.